United States Patent
Quack

(10) Patent No.: US 8,724,909 B2
(45) Date of Patent: May 13, 2014

(54) METHOD AND SYSTEM FOR GENERATING A PICTORIAL REFERENCE DATABASE USING GEOGRAPHICAL INFORMATION

(75) Inventor: Till Quack, Zurich (CH)

(73) Assignee: Kooaba AG, Zurich (CH)

( * ) Notice: Subject to any disclaimer, the term of this patent is extended or adjusted under 35 U.S.C. 154(b) by 468 days.

(21) Appl. No.: 12/995,911

(22) PCT Filed: Jun. 3, 2008

(86) PCT No.: PCT/EP2008/004424
§ 371 (c)(1),
(2), (4) Date: Jan. 11, 2011

(87) PCT Pub. No.: WO2009/146719
PCT Pub. Date: Dec. 10, 2009

(65) Prior Publication Data
US 2011/0123120 A1    May 26, 2011

(51) Int. Cl.
*G06K 9/00* (2006.01)
*G06F 17/30* (2006.01)

(52) U.S. Cl.
CPC ... *G06F 17/30241* (2013.01); *G06T 2201/0051* (2013.01)
USPC .......................................... 382/224; 382/100

(58) Field of Classification Search
USPC ................................................. 382/100, 224
See application file for complete search history.

(56) References Cited

U.S. PATENT DOCUMENTS

| | | | |
|---|---|---|---|
| 6,975,755 B1 | 12/2005 | Baumberg | |
| 7,353,114 B1 | 4/2008 | Rohlf et al. | |
| 8,121,618 B2 * | 2/2012 | Rhoads et al. | 455/456.1 |
| 2002/0075311 A1 | 6/2002 | Orbanes et al. | |
| 2004/0249774 A1 * | 12/2004 | Caid et al. | 706/14 |
| 2005/0270288 A1 * | 12/2005 | Arcas | 345/428 |
| 2007/0011171 A1 * | 1/2007 | Nurminen et al. | 707/10 |
| 2007/0118376 A1 * | 5/2007 | Mukerjee | 704/245 |
| 2008/0104227 A1 * | 5/2008 | Birnie et al. | 709/224 |
| 2009/0279794 A1 * | 11/2009 | Brucher et al. | 382/225 |

FOREIGN PATENT DOCUMENTS

EP    1 783 681 A    5/2007

OTHER PUBLICATIONS

International Search Report mailed Nov. 19, 2008, in the present application.

* cited by examiner

*Primary Examiner* — Hadi Akhavannik
(74) *Attorney, Agent, or Firm* — Knobbe Martens Olson & Bear LLP

(57) ABSTRACT

For generating a pictorial reference database from a plurality of digital images, distributed geographical sub-areas are defined (S1). For the geographical sub-areas, selected (S2) from the plurality of digital images are images with a geo-tag located in the respective geographic sub-area. Feature vectors are generated (S31) for localized visual features of the selected images. Based on the feature vectors, matching features are determined (S32) for pairs of the selected images. For pairs with matching features, in each case, a measure of visual similarity is computed (S33) based on different geometric arrangements of the localized visual features. Based on the visual similarity, clusters of images with matching objects are determined (S5) and stored (S6) in the pictorial reference database. The pictorial reference database can be generated automatically from a huge collection of images by dividing the images into geographical subsets which can be processed individually and possibly in parallel.

25 Claims, 3 Drawing Sheets

METHOD AND SYSTEM FOR GENERATING A PICTORIAL REFERENCE DATABASE USING GEOGRAPHICAL INFORMATION

FIELD OF THE INVENTION

The present invention relates to a computer-implemented method and computer system for generating a pictorial reference database. Specifically, the present invention relates to a computer-implemented method and computer system for generating a pictorial reference database from a plurality of digital images.

BACKGROUND OF THE INVENTION

The widespread use of digital cameras has lead to an interest in new types of applications based on digital images. No longer are photographs just taken and stored for private purposes, but with the ubiquitous availability of the Internet digital images are shared among users in large databases of visual data, most notably community photo collections such as Flickr (http://www.flickr.com). These pictorial data collections contain vast amounts of high-quality images, often labeled with keywords or tags. Furthermore, digital images may be transmitted as search criteria in information queries, for example queries for information related to objects in a museum or to tourist attractions in a city. Despite the enormous quantity of image data that is publicly available on the Internet, and although there has been significant progress in image recognition capabilities, both for specific objects and for object classes, there is still a need for pictorial reference databases suitable for such pictorial query applications. Typically, the textual (annotations) and/or geographic (geo-tag) metadata associated with images of public collections are of far lower quality than their counterparts in "traditional" databases, such as stock photography or news archives. Thus, although there would be an abundance of pictorial data available publicly, the indexing information and other metadata associated with the pictorial data is not suitable for use in a reference database. As the metadata is inconsistent, inaccurate and/or incomplete, images with a related pictorial content cannot be associated with each other on the basis of their metadata. However, because of the enormous quantity of images involved, it is not efficient (too time-consuming) to establish the association of images with related pictorial content based solely on image matching capabilities, as every possible combination of two images would have to be processed.

SUMMARY OF THE INVENTION

It is an object of this invention to provide a computer-implemented method and a computer system for generating a pictorial reference database from a plurality of digital images. In particular, it is an object of the present invention to provide a computer-implemented method and computer system for generating a pictorial reference database from a plurality of digital images of a publicly accessible community image collection. In particular, it is another object of the present invention to provide a computer-implemented method and computer system for generating a pictorial reference database from a plurality of digital images of a publicly accessible community image collection, whereby images with a related pictorial content can be associated with each other without having to process every possible combination of two images.

According to the present invention, these objects are achieved particularly through the features of the independent claims. In addition, further advantageous embodiments follow from the dependent claims and the description.

According to the present invention, the above-mentioned objects are particularly achieved in that for generating a pictorial reference database from a plurality of digital images, a plurality of distributed geographical sub-areas are defined. For example, the geographical sub-areas are arranged on a grid and are defined such that geographical sub-areas with a neighboring centre on the grid have a partial overlap. For example, the digital images are retrieved from a community image collection, such as Flickr, which is publicly accessible over the Internet. For example, the distributed geographical sub-areas are defined in each case as a regular geometrical shape, e.g. a square of approximately 200 m by 200 m, and the centre of the geometrical shape is arranged on a different intersection of a grid laid over a geographical area, e.g. a grid with square grid cells having intersections spaced at 100 m over the globe, a continent, a country or another geographical area. For at least one of the geographical sub-areas, selected from the plurality of digital images are images with a geo-tag located in the respective geographic sub-area. For example, a geo-tag is represented as a set of coordinates, e.g. GPS coordinates (Global Positioning System), location information from a mobile radio network, such as cell or base station identifier, textual information, e.g. a zip code or a name of a location, or another type of location information. For the selected images, generated are feature vectors for localized visual features of the selected images. For example, the feature vectors are generated for scale-invariant interest points. For pairs of the selected images, matching features are determined based on the feature vectors. For pairs of the selected images having matching features, in each case, a measure of visual similarity is computed based on different geometric arrangements of the localized visual features. For example, the measure of visual similarity is based on the number of inlaying matches of a geometric transformation between the features of the image pair. Examples include transformations based on multiple view geometry, e.g. homography, fundamental matrix, or any other topological filters, e.g. based on symmetry constraints. Based on the measures of visual similarity, clusters of images with matching objects are determined and these clusters of images are stored in the pictorial reference database. By generating geographical (regional) image subsets, i.e. by selecting from the image collection those that have a geo-tag in a defined, restricted geographical sub-area, the huge collection of images can be divided into subsets of images which can processed individually and possibly in parallel. By allowing neighboring sub-areas to have substantial overlaps, e.g, an overlap of 50%, it can be ensured that clusters falling onto the border between grid cells can be detected, too. Determining and processing localized visual features makes it possible to detect very accurate matches between depicted objects, even under significant changes/differences in viewpoint, imaging conditions, scale, lighting, clutter, noise, and partial occlusion.

In an embodiment, for pairs of the selected images, in each case, a measure of textual similarity is computed based on textual metadata associated with the respective selected images, and the clusters of images with matching objects are determined based on the measures of visual similarity and the measures of textual similarity. Preferably, an image-specific stop list is generated. The stop list includes location-specific words which depend on the geo-tag associated with a respective image. Prior to computing the measure of textual similarity, words included in the stop list are filtered from the metadata associated with the respective image.

In another embodiment, the clusters of images are classified, in each case, as an object type, indicative of a cluster comprising images of objects, or as an event type, indicative of a cluster comprising images of events. Depending on the embodiment, the clusters of images are classified additionally into further types such as a scenery type, comprising images of scenery, or as an indoor type, comprising images of indoor views. The classification of the clusters of images is based on time stamps, associated with the images, the number of different persons having provided the images, textual information associated with the images, and/or visual features of the images. Depending on the embodiment, the classification is based on further information such as the geographic location associated with the images, and/or the specific user who took the picture.

In yet another embodiment, for the clusters of images, in each case, a textual label is determined by determining statistically, from the textual metadata associated with the images of the respective cluster, word combinations occurring most frequently and with statistical confidence. For example, the textual label is determined by applying a frequent item set mining algorithm to the textual metadata. Preferably, the textual label is determined after the words included in the stop list are filtered from the metadata.

In a preferred embodiment, for the clusters of images, in each case, determined is at least one link to information related to the respective cluster's images, by searching in one or more Internet-based data collections, e.g. an encyclopedia such as Wikipedia (www.wikipedia.org), for the word combinations occurring most frequently (e.g. the frequent item set) as determined for the respective cluster, and keeping from the search result links to pages which include images with at least a defined minimum similarity to images of the respective cluster. Alternatively, for the clusters of images, in each case, determined is at least one link to information related to the respective cluster's images, by searching in one or more Internet-based data collections, e.g. an encyclopedia such as Wikipedia (www.wikipedia.org), for articles which are annotated with a location close to the respective cluster.

In a further embodiment, the measure of visual similarity is computed by computing multiple view geometry mappings, for the pairs of the selected images having matching features, by determining inlaying feature matches, and by generating a dissimilarity matrix based on the number of inlaying feature matches of the pairs of selected images. Subsequently, the clusters are determined by applying a clustering algorithm to the dissimilarity matrix. For example, the clusters are determined by applying a hierarchical agglomerative clustering algorithm to the dissimilarity matrix, whereby the clustering algorithm includes single-link-clustering, complete-link-clustering and/or average-link-clustering.

In another embodiment, received at an information server from a communication terminal is an information request which includes a digital image. The received digital image is matched to one or more matching images of one of the stored clusters stored in the reference database. Returned to the communication terminal is cluster information associated with the cluster containing the matching images. The cluster information includes textual information, geographical location information and/or a link for retrieving further related information, e.g. from an Internet-based data collection. Matching an image to a cluster in the reference database not only makes is possible for users to have their images provided automatically with metadata such as textual annotations and/or geo-tags (auto-annotation, automatic geo-tagging), but it also enables to process and include in the reference database from a community image collection images which are not provided with a geo-tag. In this way, the reference data-base can be established from geo-tagged images, in a first step, and from images without a geo-tag, in a subsequent second step.

In a further embodiment, for images of a cluster, in each case, determined is at least one user-selectable area in the respective image, for activating a link to information associated with the respective cluster, based on locations of matching features having a defined level of occurrence frequency in the respective cluster. Specifically, the statistical frequency of matching features among the images of a cluster is used to decide whether or not a matching feature is a significant feature, relating to a depicted object of interest, e.g. a tourist attraction such as a monument, or an insignificant feature, relating to a background object such as a tree or bush. Subsequently, the user-selectable area is defined around the locations of the significant features. Once the user moves a visual pointer in the user-selectable area, he can activate the link and retrieve further information about the respective image.

In yet another embodiment, generated for image pairs of an image cluster are feature constraint pairs. A feature constraint pair indicates for each matching image pair of a cluster a first visual feature in a first image of the image pair matching a second visual feature in a second image of the image pair. Clusters of features are determined based on the feature constraint pairs and mutual distances between the feature vectors. From the feature vectors associated with a feature cluster a centroid vector is computed. For each feature cluster stored are its centroid vector and an assigned feature cluster identifier. Assigned to the images of an image cluster is in each case the respective feature cluster identifier as the image's visual feature information.

In addition to a computer-implemented method and a computer system for generating a pictorial reference database from a plurality of digital images, the present invention also relates to a computer program product comprising computer program code means for controlling one or more processors of a computer, preferably a computer program product comprising a computer-readable medium containing therein the computer program code means.

In another aspect of the invention, proposed are a computer-implemented method and a computer system for generating the pictorial reference database from the plurality of digital images, whereby as an alternative to selecting the subset of digital images from the plurality of digital images based on their geo-tags, the subset of digital is determined based on other scaling criteria applicable to textual metadata associated with the digital images. Thus, in this alternative embodiment, the images are not grouped based on their geographical affinity but based on a mutual semantic association provided in their textual metadata. For example, the digital images are selected based on their respective textual metadata for a given textual target criteria such as a textual definition of an object, event or product type. For example, rather than selecting images for a geographical sub-area, the images are selected for an object type, such as towers or wooden bridges, for a product type, such as camera or mobile radio telephone, and/or for an event type, such as a specific concert or sports event.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
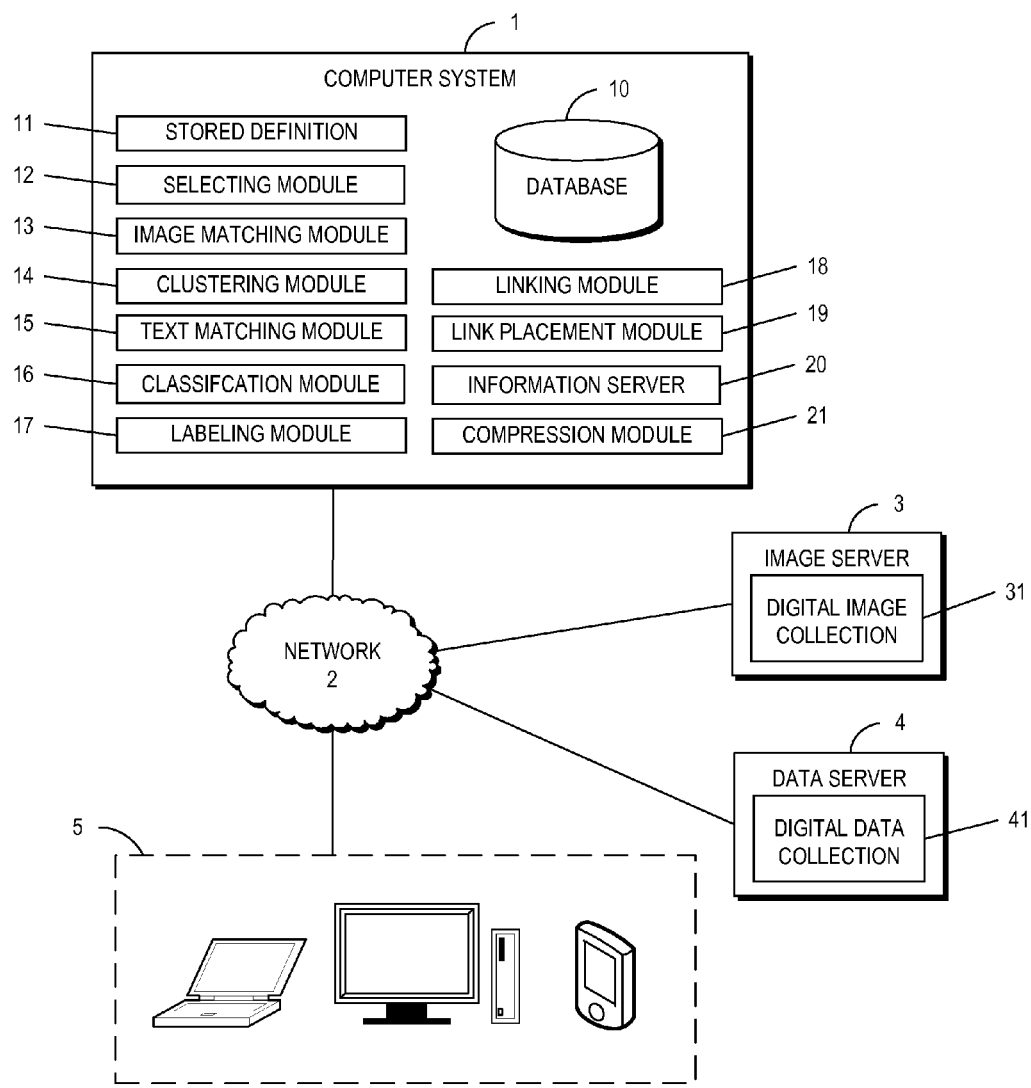
FIG. 1 shows a block diagram illustrating schematically a computer system for generating a pictorial reference database from a plurality of digital images.

In FIG. 1, reference numeral 1 refers to a computer system for generating a pictorial reference database 10 from a plurality of digital images. Computer system 1 comprises one or more computers, as well as a pictorial reference database 10 and an optional information server 20 implemented on one or more of these computers. Furthermore, computer system 1 comprises a stored definition 11 of a plurality of distributed geographical sub-areas 60, 61, 62, 63, 64 and various functional modules including a selecting module 12, an image matching module 13, a clustering module 14, a text matching module 15, a classification module 16, a labeling module 17, a linking module 18, a link placement module 19, and a compression module 21. Preferably, the functional modules are implemented as programmed software modules, comprising computer program code associated with a computer program product that is connected removably or fixed to computer system 1. One skilled in the art will understand that the functional modules may also be implemented fully or partly be means of hardware modules.

As is illustrated schematically in FIG. 1, computer system 1 is connected via a telecommunication network 2 to a digital image (photo) collection 31 provided on a networked image server 3, to a digital data collection 41 provided on a networked data server 4, and to one or more communication terminals 5, e.g. a fixed or mobile personal computer, a PDA-computer (Personal Digital Assistant) or a mobile radio telephone. The telecommunication network 2 includes the Internet accessible to the computer system 1, the image server 3, the data server 4 and the communication terminals 5 through fixed networks and/or wireless networks. For example, the telecommunication network 2 includes a local area network (LAN), an integrated services digital network (ISDN), a GSM-network (Global System for Mobile communication), a UMTS-network (Universal Mobile Telephone System) or another mobile radio telephone system, and/or a wireless local area network (WLAN) for accessing the Internet. For example, the digital image (photo) collection 31 is an Internet/web-based community photo collection such as Flickr (http://www.flickr.com). For example, the digital data collection 41 is an Internet web-based community encyclopedia such as Wikipedia (http://www.wikipedia.org).

Figure 2:
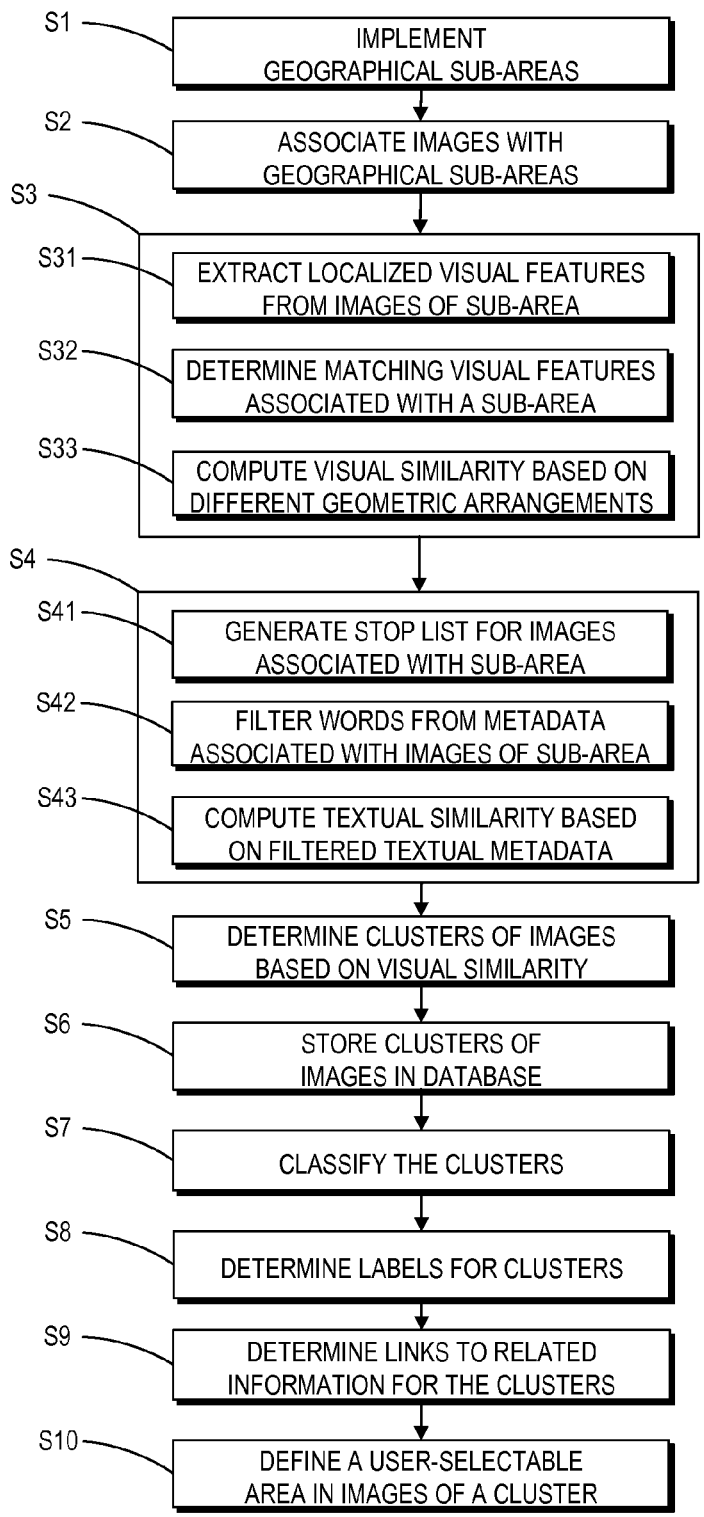
FIG. 2 shows a flow diagram illustrating an exemplary sequence of steps for generating a pictorial reference database from a plurality of digital images.

In the following paragraphs, described with reference to FIG. 2 are the configurations of the functional modules as well as a possible sequence of steps for generating the pictorial reference database 10 from a plurality of digital images.

Figure 3:
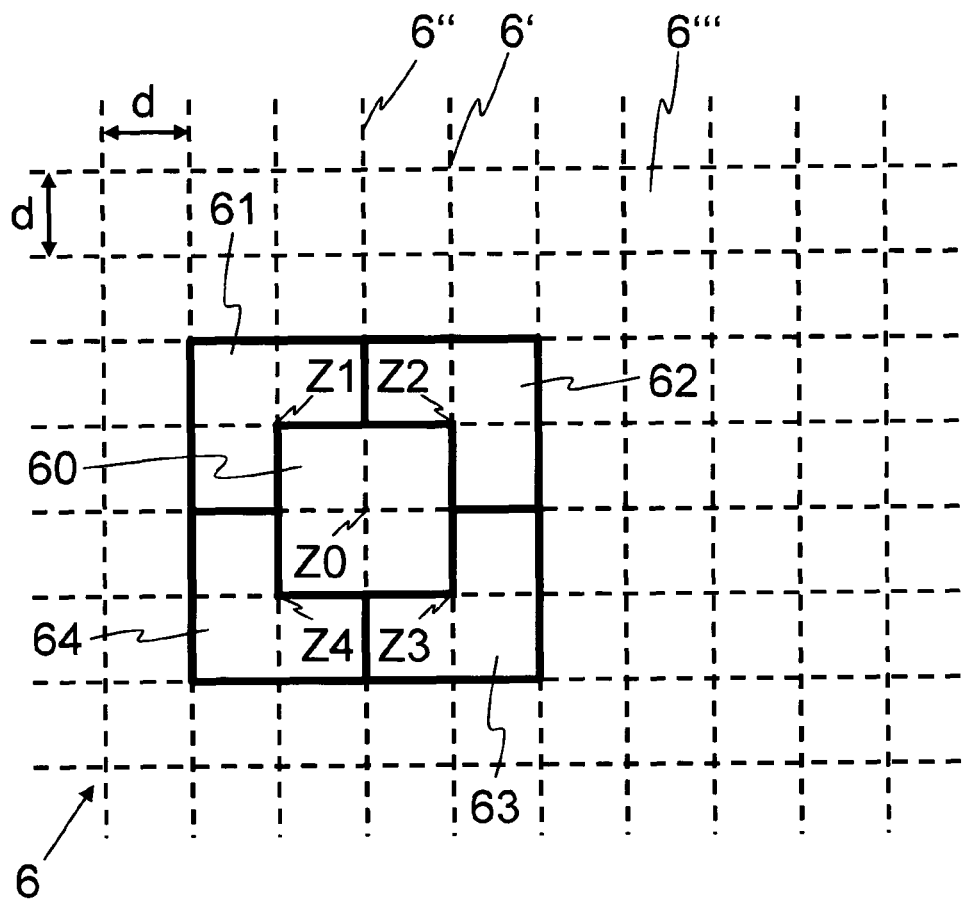
FIG. 3 shows an example of geographical sub-areas centered in each case on a different intersection of a grid.

In a preparatory step S1, the stored definition 11 of the distributed geographical sub-areas is prepared and implemented on computer system 1. Preferably, the stored definition 11 is implemented as a data table. One skilled in the art will understand, however, that the definition of the geographical sub-areas can also be implemented as program code, for example as part of a functional software module. As is illustrated in FIG. 3, the geographical sub-areas 60, 61, 62, 63, 64 are defined with a regular geometrical shape, having their respective centers Z0, Z1, Z2, Z3, Z4 arranged on different intersections 6' of a grid 6. For example, the geographical sub-areas 60, 61, 62, 63, 64 have a square or rectangular shape, e.g. with a dimension in the range of 50 m×50 m to 500 m×500 m, e.g. 200 m×200 m. It is also possible to define the geographical sub-areas 60, 61, 62, 63, 64 with alternative shapes, e.g. circular or hexagonal. In a variant, the geographical sub-areas 60, 61, 62, 63, 64 have a different (i.e. variable) size depending on their geographical location, for example the sub-areas may be dimensioned smaller in metropolitan areas than in suburban areas. The geographical sub-areas 60, 61, 62, 63, 64 are arranged in the grid 6 so that sub-areas located on neighboring grid intersections 6' have a partial overlap. For example, the grid lines 6" form square grid cells 6''' and are spaced with a distance d that results in an overlap of 50% for sub-areas 60, 61, 62, 63, 64 located at neighboring intersections 6', e.g. the grid lines 6" are spaced with a distance d of 100 m for square sub-areas of 200 m×200 m. In an alternative embodiment, in step S1, one or more textual target criteria (e.g. a list of textual target criteria), such as a textual definition of an object, event or product, are defined instead of geographical sub-areas.

In step S2, the selecting module 12 associates digital images from the digital image collection 31 with the defined geographic sub-areas 60, 61, 62, 63, 64 by selecting for the geographical sub-areas 60, 61, 62, 63, 64 those images that have a geo-tag located in the respective geographic sub-area. Depending an application and/or embodiment, the selecting module 12 establishes this association for one or more selected geographic sub-areas or for all the defined sub-areas. In an alternative embodiment, in step S2, the digital images are selected from the digital image collection 31 based on a correspondence with the defined textual target criteria, rather than their location in a geographical sub-areas.

In step S3, the image matching module 13 identifies pairs of images (photos) which contain the same object through matching based on local, scale invariant visual features and geometrical constraints on their arrangement, e.g. multiple view geometry.

In step S31, the image matching module 13 extracts from the images of a sub-area (or images associated with a textual target criteria, respectively) localized visual features, e.g. scale-invariant interest points, and generates feature vectors for the localized visual features.

In step S32, based on the feature vectors, the image matching module 13 determines matching visual features for pairs of images associated with a sub-area (or images associated with a textual target criteria, respectively). For example, because of their fast extraction times and compact description, each image is represented as a bag of 64-dimensional "Surf" feature vectors, described in H. Bay, T. Tuytelaars, and L. Van Gool, "Surf: Speeded up robust features", ECCV'06, 2006. For each pair of images in a sub-area (or associated with a textual target criteria), the matching features are determined by calculating the nearest neighbor in Euclidean distance between all feature pairs, optionally followed by a verification with a threshold, for example the 2nd nearest neighbor criterion described in D. Lowe, "Distinctive image features from scale-invariant keypoints", IJCV, 60(2), 2004. The processing time can be further reduced by using scaleable indexing methods as described in D. Nister and H. Stewenius, "Scalable recognition with a vocabulary tree", CVPR'06, 2006, or J. Philbin, O. Chum, M. Isard, J. Sivic, and A Zisserman, "Object retrieval with large vocabularies and fast spatial matching", CVPR'07, 2007, for example.

In step S33, for the pairs with matching features, the image matching module 13 computes a measure of visual similarity based on different geometric arrangements of the localized visual features. For example, multiple view geometry can be used, e.g. homography mappings are calculated for each image pair (i, j) with matching features:

$$Hx_n^i = x_n^j, n \in 1\ldots 4,$$

where H is the 3×3 homography whose eight degrees of freedom can be solved with four point correspondences n∈1 . . . 4. To be robust against outliers, H is estimated using, for example, RANSAC described in M. A. Fischler and R. C. Bolles, "Random sample consensus: A paradigm for model fitting with applications to image analysis and automated cartography", Communications of the ACM, 1981. The quality of several estimated models is measured using a quality measure. For example, the quality is determined by the number of inliers, where an inlier I is defined by a threshold on the residual error. The residual error for the model is determined by the distance of the true points from the points generated by the estimated H. Hypotheses are accepted with at least n inliers I as a match, where n is a defined threshold (e.g. ten). Using this kind of homography mapping is well suited because many images are taken from similar viewpoints. For example, a fundamental matrix could handle larger viewpoint changes, but it is also requires more computing resources, since it requires more inliers to find the correct model. Furthermore, mapping planar elements (such as building facades) works very well with homographies. An image dissimilarity (distance) matrix $d_{ij}$ is built from the pair-wise distances between images, for example the number of inlaying feature matches $I_{ij}$ for each image pair, normalized by the maximum number of inliers found in the whole dataset:

$$d_{ij} = \begin{cases} \frac{I_{ij}}{I_{max}} & \text{if } I_{ij} \geq 10 \\ \infty & \text{if } I_{ij} < 10 \end{cases}$$

For example $I_{max}$=1000, if at most 1000 Surf features per image are extracted (sorted by their discriminance), i.e. the distance ranges in [0.01 . . . 1].

In step S4, the text matching module 15 determines a measure of similarity for pairs of images (photos) based on textual metadata associated with the images. For example, for the images from the digital image (photo) collection 31 considered are various sources for textual metadata including tags, title, description and/or other textual information.

In step S41, the text matching module 15 combines the three text fields into a single text per image and generates an image-specific stop list for all images associated with a sub-area (or associated with a textual target criteria). In addition to common stopwords, this list also contains collection-specific stopwords such as indications of years and months, and terms such as "geo-tagged", "trip", "vacation", "honeymoon", etc. Furthermore, from each image's geo-tag known are the location and the corresponding place name, for instance "Rome, Italy". These location-specific place names are added to the stoplist for each photo depending on its geo-tag.

In step S42, the text matching module 15 filters words included in the stop list from metadata associated with the images of a sub-area (or associated with a textual target criteria).

In step S43, the text matching module 15 computes a measure of textual similarity based on the filtered textual metadata associated with the respective images. As with the visual features, calculated are the pair wise text similarities between the texts associated with the images. For example, a vector space model with term weighting can be applied.

In step S5, the clustering module 14 determines clusters of images with matching objects based on the measures of visual similarity (image dissimilarity matrix) and (optionally) the measures of textual similarity (text dissimilarity matrix). For each sub-area, hierarchical agglomerative clustering is applied (A. Webb., "Statistical Pattern Recognition", Wiley, second edition, 2002) to the dissimilarity (distance) matrix of each modality (visual/textual similarity). This clustering approach builds on a dissimilarity matrix and is not restricted to metric spaces. Using different linking criteria for cluster merging makes it possible to create different kinds of clusters. The following linkage methods were employed:

$$\text{single-link: } d_{AB} = \min_{i \in A, j \in B} d_{ij}$$

$$\text{complete-link: } d_{AB} = \min_{i \in A, j \in B} d_{ij}$$

$$\text{average-link: } d_{AB} = \frac{1}{n_i n_j} \sum_{i \in A, j \in B} d_{ij}$$

where A and B are the clusters to merge, and i and j index their $n_i$ and $n_j$ elements, respectively. The motivation behind these measures is to capture different kinds of visual properties that make it possible to associate a semantic interpretation with the resulting clusters. Single-link-clustering adds images to a cluster as long as they yield a good match to at least one cluster member. This results in elongated clusters that tend to span a certain area. As a result, if visual features are the basis for clustering, it can group panoramas of images that have been taken from the same viewpoint, or series of images around an object. In contrast, complete-link-clustering enforces that a new image matches to all cluster members. This strategy will therefore result in very tight clusters that contain similar views of the same object or building. Average-link-clustering, finally, takes a compromise between those two extremes and provides clusters that still prefer views of the same object, while allowing more flexibility in viewpoint shifts. In the present approach, these alternatives are pursued in parallel which makes it possible to derive additional information from a comparison of cluster outcomes. For example, at first, distinct objects or landmark buildings are identified through complete- or average-link clusters, and, later, it is determined which ones are located close to each other by their membership in the same single-link cluster.

In step S6, the clustering module 14 stores the clusters of images in the pictorial reference database 10.

In step S7, the classification module 16 classifies the clusters as object type (clusters comprising images of objects), event type (clusters comprising images of events), or other types (clusters comprising images of other elements, for example scenery images or indoor images). To discriminate between objects and events, the classification module 16 relies on metadata associated with the images of a cluster, specifically user data indicating the user who took or uploaded a photo, and timestamps indicating when a photo was taken. An "object" is defined as any rigid physical item with a fixed position, including landmark buildings, statues, etc. "Events" are defined as occasions that took place at a specific time and location, for instance concerts, parties, etc. For classification purposes, determined are the number of unique days the photos of a cluster were taken (obtained from the timestamps) and the number of different users who "contributed" photos to the cluster divided by the cluster size.

$$f_1 = |D|$$

$$f_2 = \frac{|U|}{|N|}$$

where |D| is the number of days, |U| the number of users, and |N| the number of images in the cluster. Typically, objects such as landmarks are photographed by many people throughout the year; an event on the other hand usually takes place only at one or two days and is covered by fewer users. This classification can be further improved using other data, such as visual features and/or location information.

In step S8, after the clusters have been classified into objects and events, the labeling module 17 determines and assigns to the clusters more descriptive (textual) labels. Typically, the textual metadata from the image collection 31 is "noisy", and not all images are labeled. The labeling module 17 applies statistical algorithms, for example frequent item set mining for finding the most frequent combinations of words. From large numbers (millions) of (customer) transactions, detected are rules which describe the probability that item(s) B appear, given that item(s) A have been already detected. For mining the frequent item sets for each cluster, employed is an implementation of the fp-growth algorithm, as described in C. Borgelt, "An implementation of the fp-growth algorithm", OSDM'05, 2005, using a minimal support threshold of 0.15. Any other algorithm which produces corresponding results can take the place of this specific method. In order to ensure scalability, only the top, e.g. the top fifteen, item sets per cluster are kept. The advantage of using item set mining over other probabilistic method is its speed and scalability. Tens of thousands of word combinations can be processed in fractions of seconds. The clusters are not only labeled with the most dominant words, but further linked automatically linked to content of the digital data collection 41, e.g. to Wikipedia articles available on the Internet.

In step S9, the linking module 18 determines and assigns to the clusters a link to related information in the digital data collection 41.

The frequent item sets mined in the previous step are used to form and submit a query to a search engine such as Google (www.google.com). Preferably, the search is limited to a specific data collection 41, e.g. to Wikipedia. For example, the search covers Wikipedia in all available languages, and terms in different languages are handled automatically. For each result list, the top 8 results are kept (e.g. generating a maximum of 15×8=120 possible URLs per cluster). For each page, kept is a score which counts how often the same page was retrieved using different queries. Subsequently, each of the URLs is opened and the corresponding (Wikipedia) page is scanned for images. There is a good chance that the clusters include some images taken from similar viewpoints as the ones stored in digital data collection 41. Thus, using the same method as described above, features are extracted from the images obtained from the digital data collection 41, and matched to the respective cluster's images. A link is kept only for a cluster, if it relates in the digital data collection 41 to an image which matches an image of the cluster. If an image obtained from the digital data collection 41 matches to multiple images in the respective cluster, the number of matching images in the cluster can be taken as a basis for a score on how well the image matches to the cluster. This way, multiple images, from possibly multiple digital data collections 41, which match to the same respective cluster, can be ranked according to their score, which defines how well each image matches to the cluster.

In step S10, the link placement module 19 defines a user-selectable area in one or more images of a cluster. Preferably, the user-selectable area is marked visually on the image, either permanently or dynamically, when a pointer is moved to the location of the user-selectable area. Upon selection and activation of the user-selectable area, e.g. with a pointer and a computer mouse, the link to the supplementary information is activated and the supplementary information is retrieved from the data collection 41. The link placement module 19 is configured to define the user-selectable area by determining the occurrence frequency of the cluster's matching features, and by determining in the images the locations of matching features having the highest occurrence frequency in the cluster. The user-selectable area is placed where these most frequent matching features are located in an image.

In an optional step, selected further images from the image collection 31, which are not associated with an explicit geo-tag, are processed through an automatic annotation process. In this optional step, these selected images are matched to one or more images of a cluster in the reference database 10, and the selected images are integrated, in each case, into the respective cluster having the images with the best matches.

The information server (module) 20 is configured for different types of applications, including auto-annotation of unlabeled images and mobile tourist guides. In both cases, the information server 20 receives an information request from a communication terminal 5. The information request includes a digital (query) image for which annotation and/or tourist information is requested. The information server 20 uses a recognition module for matching the received digital (query) image to one or more images of one of the clusters stored in the reference database 10. Subsequently, the information server 20 prepares and returns to requesting communication terminal 5 an information response comprising cluster information associated with the cluster containing the matching images. The cluster information includes textual information, geographical location information and/or a link for retrieving further related information from a data collection 41. Thus, for auto-annotation application, the information server 20 determines and returns, for a submitted query image, information related to one or more objects or object parts shown in the query image. It is also possible to integrate an annotated query image in the respective cluster of the reference database 10. For the application of mobile tourist guides, a tourist uses a camera integrated in a mobile communication terminal 5, for example, to take a picture of a landmark building or tourist attraction, and submits the photo as a query image to the information server 20. The information server 20 returns to the mobile communication terminal 5 relevant information and/or links for the respective query image.

In an embodiment, the compression module 21 generates and stores for the images of a cluster a compressed representation of its visual feature information. For all the matched image pairs of each image cluster the matching feature pairs are determined and listed as constraint pairs $<F_{il}, F_{jk}>$, where feature I in image j matches with feature k in image j. Subsequently, applied to all the feature vectors of the image cluster is a clustering algorithm, e.g. a constrained k-means algorithm, which clusters the feature vectors into feature clusters or prototypes (often called codebook, or visual words) based on their mutual distances and constraint pairs, enforcing that the pair of features forming the constraint is in the same cluster. This enforcement can be either strict (the pair of features must be in the same cluster) or controlled by a weight factor or a penalty factor multiplied to the distance to the candidate cluster's centroid vector. Each feature cluster is described by its identifier and its centroid vector. A centroid vector is the mean of all vectors in the feature cluster. In each image of the image cluster, the feature vector information is replaced with an identifier of the corresponding feature cluster. In this embodiment, if a query image is received from a communication terminal 5 and requires matching to an image cluster, instead of matching the features of the query image to all features of all images in the image cluster, the features of the query image are matched to the feature cluster centroids (or prototypes). In this way, each feature of the query image is also described with a feature cluster identifier. The feature cluster identifiers of the query image are used to match with the images of the image cluster (instead of the feature vectors) and a geometric verification is applied, e.g. multiple view geometry such as homography, or fundamental matrix.

The proposed computer-implemented method and computer system 1 make possible a fully unsupervised processing pipeline for generating a pictorial reference database 10 by mining and indexing community photo or image collections 31. Essentially, the sole input is a definition of geographical sub-areas 60, 61, 62, 63, 64, e.g. a grid 6 of tiles on a world map, (or one or more textual target criteria) and the output is a pictorial reference database 10 with images of mined objects and events, many of them labeled with an automatically created and verified link to a data collection 41 such as Wikipedia.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A computer-implemented method of generating a pictorial reference database from a plurality of digital images, the method comprising:
    defining a plurality of distributed geographical sub-areas;
    for at least one of the geographical sub-areas, selecting, from the plurality of digital images, images with a geo-tag located in the respective geographic sub-area;
    generating, for the selected images, feature vectors for localized visual features of the selected images;
    determining, for pairs of the selected images, matching features based on the feature vectors;
    computing, for pairs of the selected images having matching features, in each case, a measure of visual similarity based on different geometric arrangements of the localized visual features;
    determining clusters of images with matching objects based on the measures of visual similarity; and
    storing the clusters of images in the pictorial reference database.

2. The method of claim 1, wherein the method further comprises computing, for pairs of the selected images, in each case, a measure of textual similarity based on textual metadata associated with the respective selected images; and the determining the clusters of images with matching objects is based on the measures of visual similarity and the measures of textual similarity.

3. The method of claim 2, wherein the method further comprises generating an image-specific stop list, the stop list including location-specific words depending on the geo-tag associated with a respective image, and filtering words included in the stop list from metadata associated with the respective image, prior to computing the measure of textual similarity.

4. The method of claim 1, further comprising classifying the clusters of images, in each case, as an object type, indicative of a cluster comprising images of objects, or an event type, indicative of a cluster comprising images of events, based on at least one of time stamps, associated with the images, number of different persons having provided the images, textual information associated with the images, and visual features of the images.

5. The method of claim 1, further comprising determining for the clusters of images, in each case, a textual label by determining statistically from textual metadata associated with the images of the respective cluster word combinations occurring most frequently and with statistical confidence.

6. The method of claim 5, further comprising determining for the clusters of images, in each case, at least one link to information related to the respective cluster's images by searching in one or more Internet-based data collection for the word combinations occurring most frequently for the respective cluster, and keeping from the search result links to pages which include images with at least a defined minimum similarity to images of the respective cluster.

7. The method of claim 1, wherein computing the measure of visual similarity includes computing multiple view geometry mappings, for the pairs of the selected images having matching features, to determine inlaying feature matches, and generating a dissimilarity matrix based on the number of inlaying feature matches of the pairs of selected images; and determining the clusters includes applying a clustering algorithm to the dissimilarity matrix.

8. The method of claim 7, wherein determining the clusters includes applying a hierarchical agglomerative clustering algorithm to the dissimilarity matrix, the clustering algorithm including at least one of single-link-clustering, complete-link-clustering and average link-clustering.

9. The method of claim 1, wherein defining a plurality of distributed geographical sub-areas includes defining the sub-areas in each case as a regular geometrical shape, defining the geographical sub-areas such that geographical sub-areas with a neighboring centre have a partial overlap, and arranging the centre of the geometrical shape on a different intersection of a grid laid over a geographical area; generating the feature vectors includes generating feature vectors for scale-invariant interest points; and computing the visual similarity includes determining numbers of inlaying matches of a geometric transformation between features of the pairs of the selected images having matching features.

10. The method of claim 1, further comprising:
    receiving at an information server an information request from a communication terminal, the information request including a digital image;
    matching the digital image received to one or more matching images of one of the clusters stored in the reference database; and
    returning to the communication terminal cluster information associated with the cluster containing the matching images, the cluster information including at least one of textual information, geographical location information and a link for retrieving further related information.

11. The method of claim 1, further comprising determining for images of a cluster, in each case, at least one user-selectable area in the respective image for activating a link to information associated with the respective cluster, based on locations of matching features having a defined level of occurrence frequency in the respective cluster.

12. The method of claim 10, further comprising:
    generating for image pairs of an image cluster feature constraint pairs, a feature constraint pair indicating in each case a first visual feature in a first image of the image pair matching a second visual feature in a second image of the image pair;
    determining clusters of features based on the feature constraint pairs and mutual distances between the feature vectors;
    computing from the feature vectors associated with a feature cluster a centroid vector;

storing for each feature cluster its centroid vector and a feature cluster identifier; and assigning to the images of an image cluster, in each case, the respective feature cluster identifier as the image's visual feature information.

13. A computer system for generating a pictorial reference database from a plurality of digital images, the system comprising:
- a computer memory having stored therein a definition of a plurality of distributed geographical sub-areas;
- a selecting module configured to select, for at least one of the geographical sub-areas, from the plurality of digital images, images with a geo-tag located in the respective geographic sub-area;
- an image matching module configured to generate, for the selected images, feature vectors for localized visual features of the selected images, to determine, for pairs of the selected images, matching features based on the feature vectors, and to compute, for pairs of the selected images having matching features, in each case, a measure of visual similarity based on different geometric arrangements of the localized visual features; and
- a clustering module configured to determine clusters of images with matching objects based on the measures of visual similarity, and to store the clusters of images in the pictorial reference database.

14. The system of claim 13, wherein the system further comprises a text matching module configured to compute, for pairs of the selected images, in each case, a measure of textual similarity based on textual metadata associated with the respective selected images; and the clustering module is configured to determine the clusters of images with matching objects based on the measures of visual similarity and the measures of textual similarity.

15. The system of claim 14, wherein the text matching module is further configured to generate an image-specific stop list, the stop list including location-specific words depending on the geo-tag associated with a respective image, and to filter words included in the stop list from metadata associated with the respective image, prior to computing the measure of textual similarity.

16. The system claim 13, further comprising a classification module configured to classify the clusters of images, in each case, as an object type, indicative of a cluster comprising images of objects, or an event type, indicative of a cluster comprising images of events, based on at least one of time stamps, associated with the images, number of different persons having provided the images, textual information associated with the images, and visual features of the images.

17. The system claim 13, further comprising a labeling module configured to determine for the clusters of images, in each case, a textual label by determining statistically from textual metadata associated with the images of the respective cluster word combinations occurring most frequently and with statistical confidence.

18. The system of claim 17, further comprising a linking module configured to determine for the clusters of images, in each case, at least one link to information related to the respective cluster's images by searching in one or more Internet-based data collection for the word combinations occurring most frequently for the respective cluster, and to keep from the search result links to pages which include images with at least a defined minimum similarity to images of the respective cluster.

19. The system of claim 13, wherein the image matching module is configured to compute the measure of visual similarity by computing multiple view geometric mappings for determining inlaying feature matches for the pairs of the selected images having matching features, and to generate a dissimilarity matrix based on the number of inlaying feature matches of the pairs of selected images; and the clustering module is configured to determine the clusters by applying a clustering algorithm to the dissimilarity matrix.

20. The system of claim 19, wherein the clustering module is configured to determine the clusters by applying a hierarchical agglomerative clustering algorithm to the dissimilarity matrix, the clustering algorithm including at least one of single-link-clustering, complete-link-clustering and average link-clustering.

21. The system of claim 13, wherein the definition of the plurality of distributed geographical sub-areas is configured to define the sub-areas in each case as a regular geometrical shape, to define the geographical sub-areas such that geographical sub-areas with a neighboring centre have a partial overlap, and to arrange the centre of the geometrical shape on a different intersection of a grid laid over a geographical area; and wherein the image matching module is configured to generate the feature vectors for scale-invariant interest points, and to compute the measure of visual similarity by determining numbers of inlaying matches of a geometric transformation between features of the pairs of the selected images having matching features.

22. The system of claim 13, further comprising an information server module configured to receive an information request from a communication terminal, the information request including a digital image, to match the digital image received to one or more matching images of one of the clusters stored in the reference database, and to return to the communication terminal cluster information associated with the cluster containing the matching images, the cluster information including at least one of textual information, geographical location information and a link for retrieving further related information.

23. The system claim 13, further comprising a link placement module configured to determine for images of a cluster, in each case, at least one user-selectable area in the respective image for activating a link to information associated with the respective cluster, based on locations of matching features having a defined level of occurrence frequency in the respective cluster.

24. The system claim 13, further comprising a compression module configured to generate for image pairs of an image cluster feature constraint pairs, a feature constraint pair indicating in each case a first visual feature in a first image of the image pair matching a second visual feature in a second image of the image pair; to determine clusters of features based on the feature constraint pairs and mutual distances between the feature vectors;
- to compute from the feature vectors associated with a feature cluster a centroid vector; to store for each feature cluster its centroid vector and a feature cluster identifier; and to assign to the images of an image cluster, in each case, the respective feature cluster identifier as the image's visual feature information.

25. A computer program product comprising a non-transitory computer readable medium having stored thereon computer program code to at least:
- define a plurality of distributed geographical sub-areas;
- select, for at least one of the geographical sub-areas, from a plurality of digital images, images with a geo-tag located in the respective geographic sub-area;
- generate, for the selected images, feature vectors for localized visual features of the selected images;

determine, for pairs of the selected images, matching features based on the feature vectors;
compute, for pairs of the selected images having matching features, in each case, a measure of visual similarity based on different geometric arrangements of the localized visual features;
determine clusters of images with matching objects based on the measures of visual similarity; and
store the clusters of images in a pictorial reference database.

* * * * *